United States Patent

[11] 3,543,639

[72] Inventor: Roger Gettys Hill
 Racine, Wisconsin
[21] Appl. No.: 752,193
[22] Filed: Aug. 13, 1968
[45] Patented: Dec. 1, 1970
[73] Assignee: Gettys Manufacturing Company, Inc.
 Racine, Wisconsin
 a corporation of Wisconsin

[54] CONTOURING CONTROL DEVICE WITH COMPENSATION FOR MISALIGNMENT OF STYLUS AND TRACING AXES
 11 Claims, 4 Drawing Figs.

[52] U.S. Cl. .................................................. 90/13.5,
 90/13
[51] Int. Cl. .................................................. B23c 1/16
[50] Field of Search ........................................ 90/13.5,
 13.4, 13.3, 13, 62

[56] References Cited
 UNITED STATES PATENTS
 3,292,495  12/1966  Hill et al. ..................... 90/13.5

Primary Examiner—Gil Weidenfeld
Attorney—Darby & Darby

ABSTRACT: Tracing apparatus for use with machine tools comprises a device for alining the tool with respect to a fourth axis other than a tracing axis as a function of the stylus output signals representative of stylus deflection along one of the tracing axes. Means are provided to compensate for the misalinement of the stylus and tracing axes by resolving the deflection signals from the adjusted stylus into the signals which the stylus would have produced had it not been adjusted relative to such fourth axis.

Patented Dec. 1, 1970 3,543,639

INVENTOR
ROGER GETTYS HILL

BY Darby & Darby
ATTORNEYS

INVENTOR
ROGER GETTYS HILL

BY *Darby & Darby*

ATTORNEYS

INVENTOR
ROGER GETTYS HILL

BY *Darby・Darby*

ATTORNEYS

CONTOURING CONTROL DEVICE WITH COMPENSATION FOR MISALIGNMENT OF STYLUS AND TRACING AXES

This invention relates to tracing or contouring devices for use with machine tools and the like.

This invention is intended for, but not limited to, use with a tracer system such as illustrated and described in U.S. Pat. No. 3,292,495 of Hill et al., assigned to the assignee of this invention. In the Hill patent there is disclosed a control circuit for positioning a stylus (and tool) relative to a template (and workpiece). To the extent an understanding of the basic principles of tracing systems is required for an understanding of the present invention, U.S. Pat. No. 3,292,495 is incorporated herein by reference.

It is known, and disclosed in the aforesaid Hill patent, to trace with respect to three transverse axes to duplicate a three dimensional object. However, even this may not be sufficient to accommodate all of the diverse requirements which arise in this art. For example, in the machining of certain critical elements (such as the structural members of an aircraft or the like) it is not only desired to accurately reproduce the template, but it may also be desirable (or even required) that the tool, such as a milling head, be maintained transverse to a surface of the tool during the milling operation. This, as explained below, requires that the workpiece (and, therefore, the stylus also) be positioned with respect to a "fourth axis"; sometimes there is adjustment also with respect to fifth and sixth axes.

Where the stylus is adjusted with respect to such a "fourth axis", that is, any axis other than the tracing axes, the stylus output deflection signals (which control the tracing operation) no longer bear the desired relationship to the tracing axes. As explained below, this is because adjustment of the stylus relative to a "fourth axis" results in misalignment of the stylus axes and the tracing axes.

The present invention provides a means for compensating for such misalinement of the stylus axes relative to the tracing axes where there is fourth axis adjustment of the stylus, or any other realinement of the stylus and tracing axes. As a corollary feature of the invention, a novel fourth axis control system is provided to maintain the stylus in a predetermined relation (e.g. perpendicular) to the template surface.

Briefly, according to the invention, the deflection signals from a stylus, which is adjustable relative to a fourth axis (or subject to such "adjustment"), are coupled to the stators of respective resolvers in such a fashion that the voltages taken from their rotors will be equal to the deflection signals which the stylus would have produced had there been no fourth axis adjustment. The stylus and tool may be positioned with respect to the fourth axis by means of a special drive motor, so that the stylus deflection in a direction tangential to the surface of the template contacted by the stylus can be measured and the resultant signal used to control the drive motor to position the stylus.

In the system described in the aforementioned Hill patent, and in other prior standard tracing systems, the control signals are derived from a stylus which is deflected by the template. There must always be a nominal amount of stylus deflection (referred to as "nominal deflection") and it is the components of this nominal deflection as measured along the stylus axes which control the positioning means for the tracing system. Theoretically, in such systems, the nominal deflection is never exceeded. In the following description, this theoretical condition is assumed for purposes of explanation with the nominal deflection consisting of only two components, the first in a direction along the longitudinal axis of the stylus (referred to as the Z direction in the Hill patent) and the second component appearing in a direction transverse to the longitudinal stylus axis and horizontal with respect to earth (for example, the X direction in the Hill patent). Since this description relates to polar coordinate tracing, these first and second components of nominal deflection are hereinafter referred to as the rho($\rho$) and theta($\theta$) components, respectively.

In the use of tracing or contouring devices for the purpose of machine control, there are many ways in which the parts may be oriented and moved relative to each other. The following description pertains to a polar coordinate tracing system in which the template and workpiece are maintained stationary while the stylus and tool, which are mechanically secured in a fixed relationship, are physically moved. However, for purposes of the present invention, any arrangement whereby the position of the stylus relative to a template controls the position of a tool or other device relative to a workpiece is considered the full equivalent of that herein described.

Figure 1:
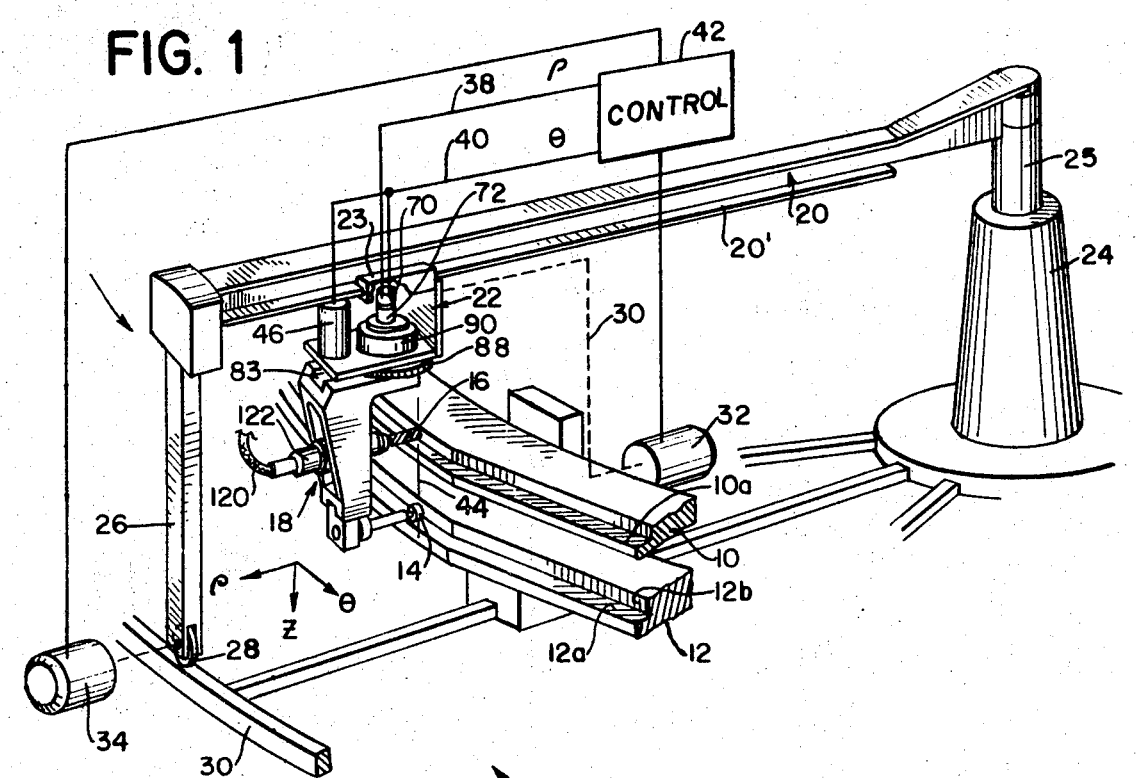
FIG. 1 is a diagrammatic perspective view, combined with a block diagram of the preferred circuit, intended for purposes of explanation.

Referring to FIG. 1, the environment in which the invention is typically employed is first explained to facilitate an understanding of the problem. FIG. 1 is a perspective view of a tracing system which might be employed to form large structural members such as those used in the framework of a large aircraft.

The workpiece and template are shown at 10 and 12, respectively. Pursuant to standard practice, a stylus 14 traces the outline of template 12 causing a milling head 16 to cut the workpiece 10 to form a duplicate of template 12. In practice, template 12 may comprise a previously contoured workpiece.

The stylus 14 and milling head 16 are fixed within a suitable retaining member 18 which is slidably mounted on radial arm 20 by means of a bracket 22 and slide 23, the latter engaging the underneath ledge 20' of arm 20. Arm 20 extends from a central vertical axle 25 which is retained within an axle housing 24 for rotation. A vertical brace 26 at the free end of arm 20 supports the retaining member 18 for rotation about axle 25, and includes a wheel 28 which rides on a circumferential track 30. This construction enables the milling head 16 and stylus 14 to be rotated about axle 25 around the workpiece 10 and template 12.

To provide polar coordinate tracing, it is necessary that the retaining member 18 be movable in a radial direction along arm 20. In this particular embodiment, this radial movement is provided by means of the diagrammatically illustrated lead screw 30 driven by a motor 32. The rotation of arm 20 may be caused by a motor 34 diagrammatically shown coupled to the driven elements.

The construction is, as so far described, a standard polar coordinate tracing system which permits tracing in two dimensions so as to machine surfaces such as 10a of workpiece 10. Where a three dimensional capability is desired, it is also necessary to move the head 16 and stylus 14 in a vertical direction, however, since this feature is not necessary for an understanding of this invention, it is omitted from this description.

During operation, the deflection of stylus 14 produces signals on lines 38 and 40 which, for example, may be representative of rho and theta components of the stylus deflection. These components indicate the extent to which the stylus 14 is deflected in a radial direction (with respect to axle 25) and in a direction tangential to such radial direction. These signals are then coupled to a control unit 42 which feeds suitable control signals to the servos 32 and 34, respectively, to adjust the position of the stylus 14 relative to template 12 (and, of course, milling head 16 relative to workpiece 10) so as to precisely trace the desired contour. In the preferred embodiment of the invention, such tracing is conducted pursuant to the above mentioned Hill U.S. Pat. No. 3,292,495 which, as explained therein, involves utilization of the rho and theta components for control of the theta and rho motors 34 and 32, respectively. However, control unit 42 may be any other device capable of utilizing the deflection voltages for purposes of controlling the servos 32 and 34. This aspect of the system also forms no part of the present invention.

A problem arises when tracing a contour as defined by the horizontal and vertical surfaces 12a and 12b of template 12. The vertical surface 12b does not form a portion of a circle having its center at axle 25. However, a surface 12b abuts against the stylus 14 and therefore is the template surface which deflects the stylus 14 to produce the components of stylus deflection which control the system operation as mentioned above. Although the stylus 14 is capable of following the surface 12b (with its longitudinal axis extending radially from axle 25), it would be skewed with respect to surface 12b during the actual tracing operation. In some highly critical situations, this is undesirable, and, in such situations, it is necessary to shift the position of the entire retaining member 18 so that stylus 14 (which is the analog of the milling head position) is perpendicular to the surface 12b. The required rotational movement of the stylus 14 cannot be achieved by movement along the three tracing axes described; therefore, it is necessary to position the stylus relative to a fourth axis, that is an axis other than the illustrated $\rho$, $\theta$ and $\zeta$ tracing axes.

Figure 2:
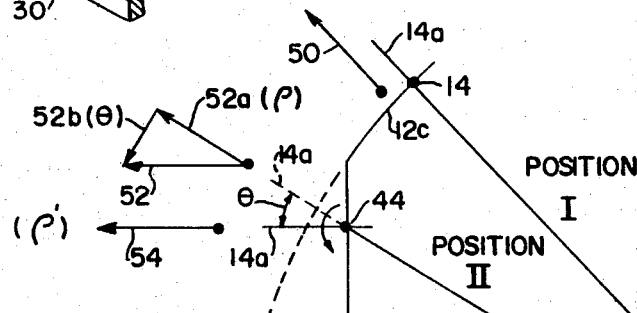
FIG. 2 is a diagrammatic illustration, showing a typical template and stylus, used for purposes of explanation.

The foregoing may be better understood with further reference to FIG. 2 which is an exaggerated illustration of the various axes involved. The axle 25 is shown with the radial arm 20 extending therefrom in two separate positions. In position I the stylus 14 is shown contacting the template surface 12c which forms a portion of a circle having axle 25 at its center. In this case, the longitudinal stylus axis 14a is radially alined with respect to axle 25 which means that it is perpendicular to the tracing surface 12c. When the radial arm 20 is moved from position I to position II, the stylus will move inwardly on arm 20 to trace the surface 12b, but the stylus axis 14a will be skewed relative to the surface 12b as shown in dashed lines in FIG. 2. According to one feature of the invention, the stylus 14 is rotated, so that its axis 14a is alined as shown in solid lines in position II of FIG. 2. If the stylus is then maintained in this position during the tracing of the surface 12b, it will remain perpendicular to surface 12b.

To provide this relative positioning, the retaining member 18 (FIG. 1) which holds the milling head 16 and stylus 14 is mounted for rotation about a fourth axis 44. A servo 46, retained on bracket 22, is responsive to the theta control signal on line 40 and rotates the retaining member 18 so as to reduce the theta deflection signal on line 40 to zero. The result of this control is to maintain the stylus axis 14a at all times transverse to the template surface 12b which deflects the stylus 14. The axis 44 is colinear with the point of contact between stylus 14 and template 12, so that this point does not change when the stylus is rotated. The theory behind the operation as just described is explained with further reference to FIG. 2.

In position I, where the stylus is deflected by a circular surface 12c having its center at the axis 25, the entire stylus deflection, as represented by vector 50, is in the radial direction. That is, the nominal stylus deflection only includes a rho component. If the radial arm 20 is then moved to position II, and assuming that the stylus is maintained with its longitudinal axis 14a as shown in dashed lines, the deflection of stylus 14, which must be transverse to the contacted surface 12b, will be represented by the vector 52. In this case, the vector 52 includes rho and theta components indicated at 52a and 52b, respectively. These vectors 52a and 52b also represent the electrical signals appearing on lines 38 and 40, respectively. Hence, if the signal on line 40 is used to drive the servo 46 so as to reduce the level of that signal to zero, the effect of the servo will be to position the stylus so that its longitudinal axis 14a is in the solid line position of position II where the stylus itself will not "see" any theta component of deflection. Hence, with the system as so far described, regardless of the shape of the curve 12b, the stylus axis 14a is maintained transverse thereto so that all deflection, i.e., the nominal stylus deflection, is along the axis 14a of the stylus. This deflection is represented in FIG. 2 by the vector 54.

Where the stylus is positioned so that its longitudinal axis 14a is transverse to the surface it is tracing, the stylus axes will not be alined with the tracing axes, unless the template surface is an arc of a circle having its center at axle 25. Such misalignment means that the components of the nominal stylus deflection will no longer contain the information required to control the basic tracing system. For example, if the stylus 14 has been rotated about the fourth axis 44 from the dashed line position to the solid line position, the output will no longer be representative of the required rho and theta deflection components (52a and 52b, respectively) but will, instead (in theory) consist purely of a deflection signal corresponding to vector 54, which would be interpreted by the tracing control 42 as pure rho deflection. Obviously, regardless of the specific system, this will cause a significant error. With respect to the preferred system of the Hill patent the effect would be to apply an energizing voltage to the theta control motor 34 and remove the voltage from rho control motor 32. Hence, it is necessary to correct for this misalinement by, in effect, resolving vector 54 into the desired theta and rho components 52a and 52b which would exist if the stylus had not been alined with respect to the fourth axis 44. The circuit of FIG. 3 is used for this purpose.

Figure 3:
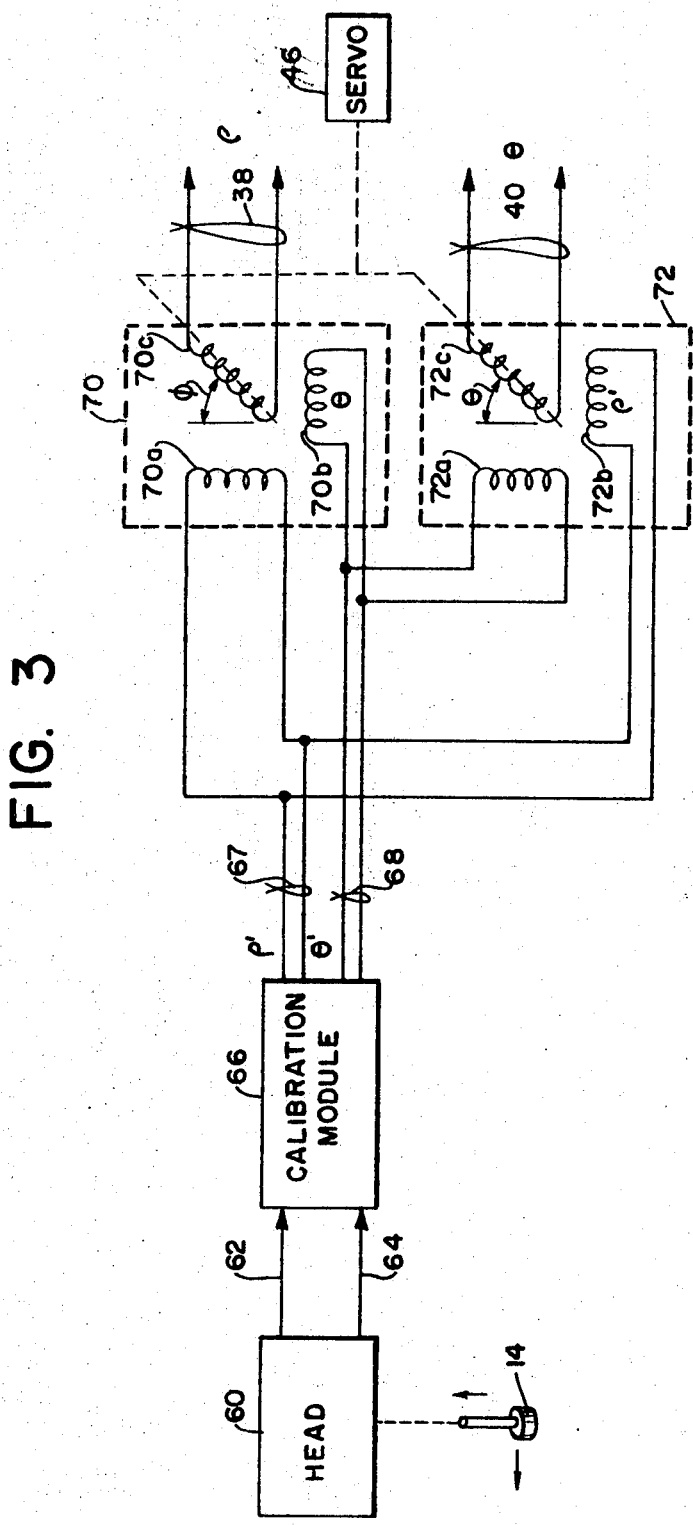
FIG. 3 is a partial circuit diagram showing how the resolvers are employed in the system.

In FIG. 3, the stylus 14 is shown as being mechanically coupled to a standard tracing head 60. Head 60 may comprise well known transducers (e.g. linear variable differential transformers) which produce respective alternating output voltages, the magnitudes of which are proportional to the components of stylus deflection, the phases indicating the direction in which such deflection occurs. Where only two dimensions are employed, as in the present example, the output of the head 60 on lines 62 and 64 represents the stylus deflection along its longitudinal axis 14a (i.e., the rho deflection) and the deflection transverse thereto in the direction of movement of the stylus (i.e., the theta deflection). The raw data from the head 60 on lines 62 and 64 is coupled to a standard calibration module 66, which produces on its output lines 67 and 68 the deflection signals without the quadrature components which exist in the raw data on the lines 62 and 64. A full description of a suitable calibration module 66 is contained in the Hill patent and forms no part of the present invention.

The outputs of calibration module 66 are coupled to a pair of resolvers 70 and 72 for the purpose of resolving the deflection signals from the realined stylus to produce the desired rho and theta deflection signals which would exist if the stylus axis had not been realined.

The resolver 70 is a standard commercially available device and includes stator coils 70a and 70b, the axes of which are displaced 90°, and an armature coil 70c which is rotatable with respect to the stator coils 70a and 70b. The construction of the resolver 72 is identical to that of resolver 70 and includes stator coils 72a and 72b and rotatable armature coil 72c. The deflection signals on line 67 from the module 66 are coupled to resolver stator coils 70a and 72b. The deflection signals on line 68 from the module 66 are coupled to the stator coils 70b and 72a. As diagrammatically represented by dashed lines, the armature coils 70c and 72c are mechanically coupled together and to the output shaft of servo 46 which rotates the stylus about the fourth axis 44.

The operation of the resolvers 70 and 72 is standard. The output voltage across each rotor coil is a known trigonometric function of the voltages coupled to its stator coils and the angular displacement of the rotor. Thus, if $\rho'$ equals the deflection voltage on lines 67,
$\theta'$ equals the deflection voltage on lines 68, and
$\phi$ equals the angular displacement of armatures 70c and 72c, then $\rho = \rho' \cos \phi + \theta' \sin \phi$, and $\theta = \rho' \sin \phi + \theta' \cos \phi$ In the ideal condition of FIG. 2, this will resolve vector 54 ($\rho'$) into the desired vectors 52a ($\rho$) and 52b ($\theta$). Although in theory there is no $\theta'$ deflection, in practice a $\theta'$ deflection voltage will exist and this voltage is accounted for by the last term in each of the above equations.

Instead of using two separate resolvers, a single resolver having two rotor coils angularly displaced 90° can be employed to achieve the identical effect.

Figure 4:
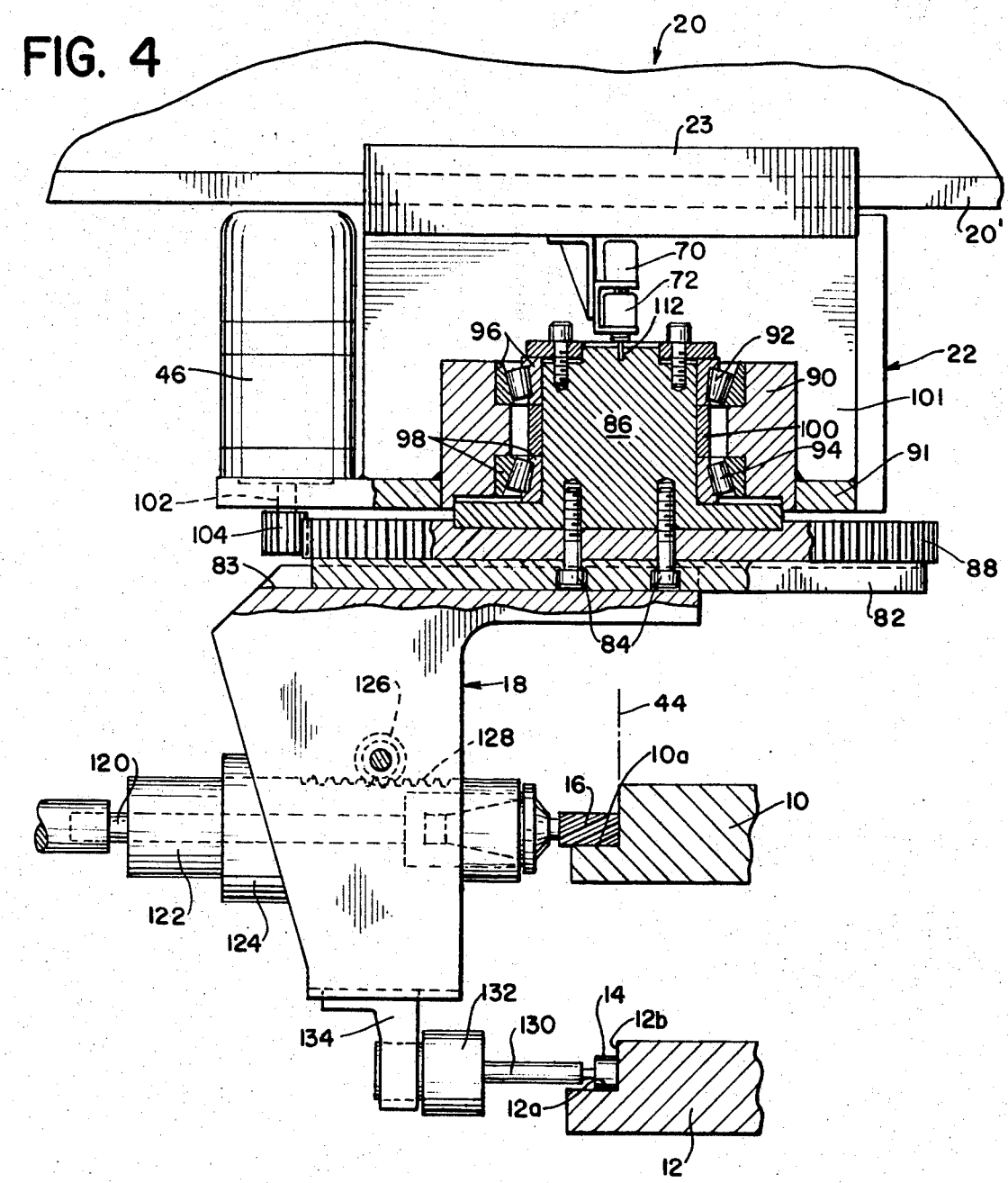
FIG. 4 is a side view partially in section showing certain mechanical details of a feature of the invention.

FIG. 4 illustrates the construction of a preferred embodiment of the invention. Wherever possible, the same numerals used in FIGS. 1, 2 and 3 are employed to designate corresponding elements in FIG. 4. The electrical leads required to complete the control circuits and the resolver circuit of FIG. 3 are not illustrated in FIG. 4. Additionally, FIG. 4 does not include an illustration of the specific means used to provide the radial movement of the stylus 14.

The retaining member 18 is mounted on a horizontal track 82 which fits into a dovetail slot 83 on the top of the member 18. The track 82 is secured by bolts 84 to a central hub 86 and a circular gear 88. The hub 86 is centrally received within a casing 90 which is fixed in a suitable aperture (not numbered) within the horizontal leg 91 of bracket 22. Two rings of tapered roller bearings 92 and 94 are retained within respective races 96 and 98 to permit rotation of hub 86 within casing 90. A central sleeve 100 is disposed around hub 86 intermediate the races 96 and 98, the races 96 and 98 being suitably secured to the hub 86 and casing 90 to permit the hub to rotate with respect to the casing. Bracket 22 includes a rear supporting plate 101 extending downwardly from slide 23 to mechanically support the structure described.

The servo 46 is also mounted on the horizontal portion of bracket 22 and includes an output shaft 102 terminating in a pinion 104 which meshes with the circular gear 88. Hence, energization of servo 46, as explained above, will rotate circular gear 88 causing the retaining member 18 (with the stylus 14 and milling head 16) to rotate about the fourth axis 44, here coinciding with the longitudinal axis of hub 86.

The resolvers 70 and 72 are shown mounted on a shaped support member 110 extending downwardly from the undersurface of the bracket slide 23. The resolvers 70 and 72 are vertically stacked as illustrated with the armature coils thereof coupled to a common shaft 112 which is fixed to the upper portion of hub 86. Hence, rotation of hub 86 by the servo 46 will also rotate the armature coils 70c and 72c (see FIG. 3) to produce the desired compensated rho and theta deflection output voltages.

The remaining portion of the assembly as shown in FIG. 4 may be conventional. The milling head 16 is driven by a drive shaft 120 which is retained in a cylindrical housing 122 slidably received within a sleeve 124. A circular gear 126 engages a rack 128 on the housing 122 to permit adjustment of the milling head 16 relative to the stylus 14.

The stylus 14 is retained within a standard holding arm 130 which extends to the right from a stylus head 132 in which the linear variable differential transformers (not illustrated) are held. The circuit of the calibration module 66 (FIG. 3) may also be retained within the head 132 whereby the output leads (not shown) from the head 132 would correspond to the leads 67 and 68 shown in FIG. 3. The entire stylus construction may be mounted in a bracket 134 which extends downwardly from the lowermost portion of the retaining member 18.

The invention is not limited to any special type of machine tool and would have utility in any situation where misalinement of stylus and tracing axes occurs whether or not due to a deliberate fourth axis adjustment. Use of the term "fourth axis" is not intended to imply utility with only two or three axes tracing systems, the term being used as a term of art relating to movement of the stylus with respect to an axis as to which there is no corresponding deflection signal. The invention is not limited to polar coordinate tracing and the same principles could be used in virtually the same fashion with rectangular coordinates. Two or more systems can be combined if fifth or sixth axis tracing, etc. is desired. Various other modifications of the invention will also be obvious to those skilled in the art.

I claim:

1. Tracing apparatus for use in controlling the position of a tool relative to a workpiece in response to the movement of a stylus relative to a template, wherein there is provided means for moving said stylus with respect to said template along two tracing axes, and wherein said stylus produces first and second electrical signals for controlling said moving means, said signals being representative, respectively, of stylus deflection along two stylus axes, the improvement comprising means for compensating for a change in alinement of said stylus axes relative to said tracing axes, said compensating means including resolver means responsive to said change in alinement for producing first and second compensated deflection signals each of which is a function of said first and second electrical signals and said change in alinement.

2. Tracing apparatus according to claim 1, wherein said resolver means includes stator coils responsive to said first and second electrical signals and rotatable armature coils for producing said compensated deflection signals, said armature coils being rotatable in response to said change in alinement.

3. Tracing apparatus according to claim 1, wherein said change in alinement is caused by an angular displacement of said stylus axes relative to said tracing axes, said first compensated deflection signal being equal to $x \cos \Phi + y \sin \Phi$, said second compensated deflection signal being equal to $x \sin \Phi + y \cos \Phi$, where $x$ equals said first electrical signal, $y$ equals said second electrical signal and $\Phi$ equals said angular displacement.

4. Tracing apparatus according to claim 3, wherein said resolver means includes stator coils responsive to said first and second electrical signals and rotatable armature coils for producing said compensated deflection signals, said armature coils being rotatable in response to said change in alinement.

5. Tracing apparatus for use in controlling the position of a tool relative to a workpiece in response to the movement of a stylus relative to a template, wherein there is provided means for moving said stylus with respect to said template along two tracing axes, and wherein said stylus produces first and second electrical signals representative, respectively, of stylus deflection along two stylus axes, the improvement comprising additional means responsive to one of said signals for moving said stylus with respect to an axis other than said stylus axes so as to aline said stylus in a predetermined relation to the surface of the template.

6. Tracing apparatus according to claim 5, wherein said additional moving means comprises means for rotating said stylus about said other axis.

7. Tracing apparatus according to claim 6, wherein said other axis is colinear with the point of contact between said stylus and template.

8. Tracing apparatus according to claim 6, wherein one of said electrical signals represents stylus deflection in a direction tangential to said template, said rotating means being operable to maintain said one electrical signal at a minimum value.

9. Tracing apparatus according to claim 5, including resolver means responsive to said additional moving means and said first and second signals for producing third and fourth control signals, said third and fourth signals being substantially equal to the value said first and second signals, respectively, would have in the absence of any stylus movement by said additional moving means.

10. Tracing apparatus according to claim 9, wherein said resolver means includes stator coils responsive to said first and second electrical signals and rotatable armature coils for producing said third and fourth control signals, said armature coils being rotatable by said additional moving means.

11. Tracing apparatus according to claim 10, wherein said third control signal is equal to $x \cos \Phi + y \sin \Phi$, and said fourth control signal is equal to $x \sin \Phi + y \cos \Phi$, where $x$ equals said first electrical signal, $y$ equals said second electrical signal and $\Phi$ equals the angular displacement of said armature coils.